United States Patent Office 3,006,959
Patented Oct. 31, 1961

3,006,959
2-HYDROXY-4-N-DODECYLOXYBENZOPHENONE
John Brian Armitage, Rolf Dessauer, and Archibald Miller Hyson, Wilmington, Del., assignors to E. I. du Pont de Nemours and Company, Wilmington, Del., a corporation of Delaware
No Drawing. Filed Sept. 22, 1958, Ser. No. 762,274
1 Claim. (Cl. 260—591)

This invention relates to plastic compositions of matter, and more particularly to polyethylene compositions and to articles made therefrom having improved properties with respect to resistance to light, especially in the ultraviolet (U.V.) range (2900–3600 A.).

Over a period of years, considerable research attention has been directed to developing an effective, non-discoloring U.V. stabilizer for the polymers of ethylene. Many initially promising leads have been investigated with discouragingly frequent failures. Moreover, neither commercial products, literature nor patents reveal that a wholly satisfactory adjuvant had been found, prior to this invention. Certain substituted hydroxybenzophenones have been suggested for use as light stabilizers for various plastics, none, however, have been found to be particularly effective in polyolefine compositions.

An object of this invention is to provide plastic compositions, based on normally solid polyolefines, which are resistant to discoloration when exposed to ultraviolet light. Another object is to provide compositions of such polymeric materials stabilized against such exposure. Another object is to provide such compositions having increased stability performance. Yet another object of the invention is to provide compositions of polyethylene containing compatible compounds having a hydroxybenzophenone nucleus. Still another object is the substantial retardation of degradation of polyolefine compositions by ultraviolet light through the use of compositions containing a hydroxybenzophenone nucleus that is non-migrating, non-volatile in character and remains permanently associated with the polyolefine. Other objects and advantages of the invention will hereinafter appear.

This invention relates to the use of compounds containing a hydroxybenzophenone nucleus which has been made compatible with branched and/or linear polyolefines by attaching a long hydrocarbon chain substituent to the nucleus. To effect compatibility, the long hydrocarbon chain or chains are attached to hydroxybenzophenone nuclei and related nuclei having these chemical structures:

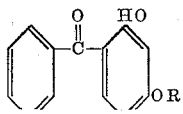

and

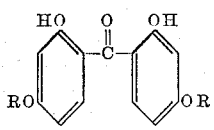

in which R is a hydrocarbon group such as an alkyl or aryl group that contains from 8 to 20 carbon atoms. These polyolefine stabilizers can be incorporated into polyolefines and are effective in amounts up to about 1% by weight of the polyolefines without exudation ("blooming") occurring even after extended periods of use.

General methods for preparing the hydroxybenzophenone ethers are known and are described, for example, in U.S. Patent 2,773,903 of Hardy et al., December 11, 1956.

The polyolefine constituents of the plastic U.V. stabilized composition of the invention include the conventional normally solid branched chain polyethylenes; the linear polyethylenes, such as are prepared by any suitable process such, for example, as the processes of the Larcher and Pease U.S. Patent 2,816,883, issued Dec. 17, 1957; and the Pease and Roedel U.S. Patent 2,762,791, issued Sept. 11, 1956; and the polyolefines of alkenes of higher molecular weight than ethylene, such as propene, butene, pentene, etc. The compounds containing the hydroxybenzophenone nucleus of the invention likewise markedly improve the resistance of copolymers of the above olefines or copolymers of the above olefines with other polymerizable organic compounds.

The hydroxybenzophenone nucleus-containing adjuvants are incorporated into the polyolefine in concentrations between 0.0005% and about 1% by weight; those with the longer hydrocarbon chains are generally more compatible than those with the shorter chains. The compositions are formed by any suitable method such, for example, as working the polyolefine and the adjuvants on a rubber mill at a temperature between 140 and 170° C., dissolving the adjuvants in a suitable solvent such as acetone, hexane, and benzene, and spraying the solution into a Banbury mixer containing the polyethylene or by any other suitable method known to the art for adding small amounts of an adjuvant to polyolefines, such as the methods shown in the Latham and Strain U.S. Patent 2,434,662, issued Jan. 20, 1948.

The adjuvants of the examples given below were milled into polyethylene on a two-roll mill at 160±5° C. for 10 minutes. Films (10 mil) compression molded from these compositions were then exposed to accelerated weathering tests. Filtered light with wet and dry cycles (18 min. wet and 102 min. dry) in an Atlas weatherometer was used to simulate outdoor conditions. The stabilization obtained with the hydroxybenzophenone adjuvants is illustrated and compared with polyethylene film containing no stabilizer of any kind and with such film containing an antioxidant, the Elmendorf tear test (ASTM 689–44) and melt index test (ASTM D-1238–52) together with a hand pull qualitative elongation test were used. In the table, Elm. designates the Elmendorf test and M.I. the melt index test.

ACCELERATED WEATHERING OF POLYETHYLENE FILMS (10 MIL)

| Adjuvant | Percent by weight | Control | | 500 hrs. | | 1,000 hrs. | | |
|---|---|---|---|---|---|---|---|---|
| | | Elm. | M.I. | Elm. | M.I. | Elm. | M.I. | Percent Elong. |
| 1. U.V. 1* antioxidant | 1.0 0.1 | 119 | 2.34 | 149 | 0.62 | 127 | 0.18 | 400–500 |
| 2. U.V. 2* antioxidant | 0.5 0.1 | 122 | 2.20 | 122 | 0.27 | 113 | 0.13 | 400–500 |
| 3. U.V. 3* antioxidant | 0.5 0.1 | 111 | 2.18 | 155 | 0.25 | 132 | 0.05 | 400–500 |

See footnote at end of table.

ACCELERATED WEATHERING OF POLYETHYLENE FILMS (10 MIL)—Continued

| Adjuvant | Percent by weight | Control | | 500 hrs. | | 1,000 hrs. | | |
|---|---|---|---|---|---|---|---|---|
| | | Elm | M.I. | Elm | M.I. | Elm | M.I. | Percent Elong. |
| 4. None | | 102 | 2.20 | (1) | (1) | | | |
| 5. 4,4'thiobis-(6-t-butyl-m-cresol) (antioxidant alone) | 0.2 | 124 | 2.16 | 42 | 0.90 | (1) | (1) | |
| 6. U.V. 4* antioxidant | 2.0 0.1 | 123 | 1.05 | 108 | 0.3 | 38 | 0.1 | |
| 7. U.V. 5* antioxidant | 2.0 0.1 | 102 | 0.8 | 76 | 0.2 | (1) | (1) | |
| 8. U.V. 6* antioxidant | 1.0 0.1 | 151 | 2.3 | 149 | 0.38 | 147 | 0.09 | |
| 9. U.V. 7* | 1.0 | 107 | 2.3 | 120 | 0.38 | 131 | 0.29 | |

¹ Brittle.

1* = 2-hydroxy-4-octyl oxybenzophenone.
2* = 2-hydroxy-4-octyl oxybenzophenone.
3* = 2,2'dihydroxy-4,4'dioctadecyl-oxybenzophenone.
4* = 2,2'-dihydroxy-4-methoxy-4'-ethoxybenzophenone.
5* = 2,2'-dihydroxy-4-methoxybenzophenone.

6* = 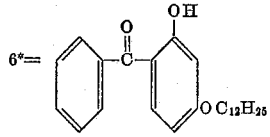

7* = 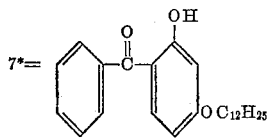

Antioxidant used in above examples was 4,4'-thiobis-(6-t-butyl-m-cresol).

Elongation of Experiment 3 by hand pull was about 400–500% and the films were clear an odorless after 1000 hours exposure. Elongation before exposure was 700%.

The hydroxybenzophenones having low molecular weight hydrocarbon substituents such as the methyl, ethyl, and phenyl substituents are, it has been found, unsuitable and ineffective as U.V. stabilizers for the polyolefines. The methyl and ethyl and like substituted ketones are quite volatile while the intermediate alkyl- and phenyl-substituted derivatives are incompatible even when used in amounts as low as 1%. When higher molecular weight substituents are present, however, there is not only compatibility of the hydroxybenzophenone compound with the polyolefine but also effective U.V. stabilization of the polymer.

Light-resistant compositions of exceptional utility are made from the ethylene polymers with the hydroxybenzophenones which are compatible therewith. The utility of such compositions is increased by the presence of suitable heat stabilizers such, for example, as those included in the examples as well as N-(p-hydroxyphenyl)-morpholine, tri-tert-butyl-p-phenyl phenol, 4,4'-butylidene-bis-(6-tert-butyl-m-cresol), and 2,2'-methylenebis(4-methyl-6-tert-butyl phenol). These stabilizers may be used in amounts ranging between 0.001 to 0.5% by weight of the polyolefine.

Particularly effective compounds containing the hydroxybenzophenone nuclei, which compounds are modified sufficiently by a substituent group to render them compatible with polyolefines, include 2-hydroxy-4-octyl-oxybenzophenone, 2-hydroxy-4-dodecyloxybenzophenone, 2-hydroxy-4-octadecyloxybenzophenone, 2,2'-dihydroxy-4,4'-dioctyloxybenzophenone, and 2,2'-dihydroxy-4,4'-didodecyloxybenzophenone.

EXAMPLE 10

*Preparation of 2-hydroxy-4-n-octyloxybenzophenone*

A mixture of 21.4 parts of 2,4-dihydroxy-benzophenone, 28.5 parts of 1-bromooctane, 20.7 parts of potassium carbonate and 237 parts of acetone were refluxed for 16 hours and filtered hot from the inorganic salts formed. Then, the filtrate was concentrated by distillation to ⅓ its volume and the liquid cooled. Long needles of 2-hydroxy-4-n-octyloxybenzophenone crystallized out and these were filtered off and washed with ethanol. The product (23 parts) melted at 45° to 46° C. Its identity was confirmed by analysis: Found (calc.): percent C, 77.6 (77.2); percent H, 8.1 (7.98).

EXAMPLE 11

*Preparation of 2-hydroxy-4-n-dodecycloxybenzophenone*

A mixture of 53.5 parts of 2,4-dihydroxybenzophenone, 93 parts of 1-bromododecane, 51.5 parts of potassium carbonate and 593 parts of acetone were refluxed for 16 hours and filtered hot from the inorganic salts formed. The filtrate was concentrated to ¼ its volume and allowed to cool. The crystals which formed were filtered off and washed with ethanol. The product (67 parts) melted at 49° to 50° C. and its identity was confirmed as 2-hydroxy-4-n-dodecyloxybenzophenone by analysis.

We claim:

A new composition of matter, 2-hydroxy-4-n-dodecyloxybenzophenone.

References Cited in the file of this patent

UNITED STATES PATENTS

| 2,675,366 | Pullman | Apr. 13, 1954 |
| 2,693,492 | Hoch | Nov. 2, 1954 |
| 2,777,828 | Day et al. | Jan. 15, 1957 |
| 2,789,140 | Von Glahn et al. | Apr. 16, 1957 |
| 2,819,247 | Lundberg | Jan. 7, 1958 |
| 2,822,340 | McGovern et al. | Feb. 4, 1958 |
| 2,852,488 | Clark et al. | Sept. 16, 1958 |
| 2,861,053 | Lappin et al. | Nov. 18, 1958 |
| 2,887,466 | Lappin et al. | May 19, 1959 |

FOREIGN PATENTS

| 201,160 | Australia | Apr. 28, 1955 |

OTHER REFERENCES

Monsanto Abstract (Australian), 4110/54; available to public July 19, 1955.

UNITED STATES PATENT OFFICE
CERTIFICATION OF CORRECTION

Patent No. 3,006,959            October 31, 1961

John Brian Armitage et al.

It is hereby certified that error appears in the above numbered patent requiring correction and that the said Letters Patent should read as corrected below.

Columns 1 and 2, and columns 3 and 4, under the heading "Adjuvant", Items 1, 2, 3, 6, 7 and 8, should read, respectively:

U.V. 1*
                 Antioxidant ----

U.V. 2*
                 Antioxidant ----

U.V. 3*
                 Antioxidant ----

U.V. 4*
                 Antioxidant ----

U.V. 5*
                 Antioxidant ----

U.V. 6*
                 Antioxidant ---- so that the word "Antioxidant" will appear opposite its correct amount in the column entitled "Percent by weight" in each instance, the said amount being "0.1; column 3, line 36, for "an" read -- and --.

Signed and sealed this 24th day of April 1962.

(SEAL)
Attest:

ESTON G. JOHNSON
Attesting Officer

DAVID L. LADD
Commissioner of Patents